Patented Aug. 15, 1950

2,518,659

UNITED STATES PATENT OFFICE 2,518,659

PREPARATION OF N-BUTYLAMINE

Marshall R. Brimer, James E. Magoffin, and Harold Von Bramer, Kingsport, Tenn., assignors to Eastman Kodak Company, Rochester, N. Y., a corporation of New Jersey No Drawing. Application June 9, 1945, Serial No. 598,644

10 Claims. (Cl. 260—583)

This invention relates to a process for preparing n-butylamine.

It is known that n-butylamine can be prepared by passing n-butyraldeyde vapors, ammonia and hydrogen over a hydrogenation catalyst at elevated temperatures. It is also known that aldimines can be hydrogenated with a hydrogenation catalyst to give alkylamines. If n-butyraldehyde is introduced into a pressure reaction vessel together with ammonia, hydrogen and a nickel hydrogenation catalyst, the vessel closed and heated to reaction temperature (100 to 150° C.) a fair yield of n-butylamine can be obtained. However, if an attempt to reuse the nickel catalyst is made, the yield of n-butylamine drops off in the second run and in the third run is very poor. Manifestly such a process is not satisfactory for large-scale production, for in order to obtain economical yields of n-butylamine, it is necessary to make prodigal use of fresh catalyst.

We have now found that n-butylamine can be produced from a mixture of n-butyraldehyde, n-butyraldimine and ammonia by hydrogenation in the presence of a metal hydrogenation catalyst in high yields with much less impairment of the catalyst activity. (In fact, the catalyst activity can be maintained for a considerable time, if the catalyst is protected from air between runs.) In our new process, the side-reactions are either reduced to such an extent or so altered in nature that the side-reaction products do not deleteriously affect the activity of the catalyst nearly as much as they do in the known processes. In our new process there is much less formation of side-reaction products, such as butyl alcohol, unsaturated high molecular weight aldehydes and secondary or tertiary amines.

It is, accordingly, an object of our inventon to provide an improved process for preparing n-butylamine. Other objects will become apparent hereinafter.

In accordance with our invention, we prepare n-butylamine (normal monobutylamine) by hydrogenating, in a closed vessel and in the presence of a metal hydrogenation catalyst, a mixture consisting essentially of n-butyraldehyde, n-butyraldimine and ammonia, said mixture containing, exclusive of the ammonia, from about 20 to about 50 per cent by weight of n-butyraldehyde, and containing more ammonia than is molecularly equivalent to the n-butyraldehyde which is present. Most advantageously, the mixture contains from about 20 to about 25 per cent by weight of n-butyraldehyde. The ammonia employed is advantageously from about 1.1 moles to about 2 moles for each mole of n-butyraldehyde present. Most advantageously, the quantity of ammonia is about 1.5 moles for each mole of n-butyraldhyde.

The hydrogenation is most advantageously effected at from about 135° C. to about 165° C. The hydrogenation is ordinarily complete in from ½ to 1 hour, at these temperatures.

Any metal hydrogenation catalyst can be employed, e. g. platinum, nickel, cobalt, palladium, etc. Most advantageously a nickel catalyst, particularly an active nickel catalyst, prepared from a nickel-aluminum alloy by dissolving the aluminum away from the nickel with sodium hydroxide or sodium carbonate, is employed.

The following example will serve to illustrate further the manner of practicing our invention.

Example 2190 g. (29.2 mol.) of 96 per cent n-butyraldehyde were added gradually to 1776 g. of vigorously agitated 28 per cent (by weight) aqeuous ammonia (29.2 mol. of ammonia and 70.9 mol. of water) over a period of two hours. The reaction mixture was cooled to hold the temperature at about 25° C. during the addition of the n-butyraldeyde, and the vigorous agitation at about 25° C. was continued after the addition of the n-butyraldehyde for about ¼ hour. The agitation was then stopped and the reaction mixture allowed to settle. The lower aqueous layer was drawn off and ½ of the weight of the upper layer which contained n-butyraldimine and n-butyraldehyde, the n-butyraldehyde constituting from 20 to 25 per cent (by weight) of the layer, was charged into a hydrogenation autoclave along with 5.4 g. of dry nickel catalyst (prepared as indicated above from a nickel-aluminum alloy) and enough anhydrous ammonia to bring the ammonia to n-butyraldehyde ratio to 1.5:1. The autoclave was closed, the contents agitated and hydrogen (500 lbs. per square inch) was introduced. The autoclave was heated to 135° C. where vigorous reaction took place. The temperature was allowed to rise to 150° C. and after one hour at this temperature, the reaction was complete. Agitation was stopped and the catalyst permitted to settle. The supernatant liquid was drawn off through a discharge pipe positioned so that the entrance thereto was just above the layer of catalyst in the bottom of the autoclave. The liquid which was thus drawn off was refluxed to free it from ammonia and then cooled. This process was repeated six times until all of the aforesaid upper layer was utilized. The combined reduction liquids (free from ammonia) were found to weigh 1946 g. (91 percent yield) and consisted of n-butylamine of high purity. Had the catalyst been exposed to air prior to using in this process, the yield would have been about 1500 g. and had n-butyraldehyde and ammonia along been hydrogenated, the yield would have been about 1000 g.

In carrying out our process, hydrogen pressures of from 200 to 1000 lbs. per square inch can be employed.

In a manner similar to that illustrated in the foregoing example, mixtures of n-butyraldehyde and n-butyraldimine containing 50 per cent, 40 per cent, 30 per cent or 20 per cent (by weight) of n-butyraldehyde can be hydrogenated to give high yields of n-butylamine. The preparation of mixtures of n-butyraldehyde and n-butyraldimine is described in our copending application Serial No. 598,645, filed of even date herewith (now U. S. Patent No. 2,420,584, dated May 13, 1947).

What we claim as our invention and desire to be secured by Letters Patent of the United States is:

1. A process for preparing n-butylamine comprising hydrogenating, in a closed vessel and in the presence of a metal hydrogenation catalyst, a mixture consisting essentially of n-butyraldehyde, n-butyraldimine and ammonia, said mixture, exclusive of the ammonia, containing from about 20 to about 50 per cent by weight of n-butyraldehyde and containing more ammonia than is molecularly equivalent to the n-butyraldehyde which is present.

2. A process for preparing n-butylamine comprising hydrogenating, in a closed vessel and in the presence of a metal hydrogenation catalyst, a mixture consisting essentially of n-butyraldehyde, n-butyraldimine and ammonia, said mixture containing, exclusive of the ammonia, from about 20 to about 25 per cent by weight of n-butyraldehyde and containing more ammonia than is molecularly equivalent to the n-butyraldehyde which is present.

3. A process for preparing n-butylamine comprising hydrogenating, in a closed vessel and in the presence of a metal hydrogenation catalyst, a mixture consisting essentially of n-butyraldehyde, n-butyraldimine and ammonia, said mixture exclusive of the ammonia, containing from about 20 to about 50 per cent by weight of n-butyraldehyde and containing from about 1.1 to about 2 moles of ammonia for each mole of n-butyraldehyde which is present.

4. A process for preparing n-butylamine comprising hydrogenating, in a closed vessel and in the presence of a metal hydrogenation catalyst, a mixture consisting essentially of n-butyraldehyde, n-butyraldimine and ammonia, said mixture, exclusive of the ammonia, containing from about 20 to about 50 per cent by weight of n-butyraldehyde and containing about 1.5 moles of ammonia for each mole of n-butyraldehyde which is present.

5. A process for preparing n-butylamine comprising hydrogenating, at from 135° to 165° C., in a closed vessel and in the presence of a metal hydrogenation catalyst, a mixture consisting essentially of n-butyraldehyde, n-butyraldimine and ammonia, said mixture containing, exclusive of the ammonia, from about 20 to about 50 per cent by weight of n-butyraldehyde and containing more ammonia than is molecularly equivalent to the n-butyraldehyde which is present.

6. A process for preparing n-butylamine comprising hydrogenating, at from 135° to 165° C., in a closed vessel and in the presence of a metal hydrogenation catalyst, a mixture consisting essentially of n-butyraldehyde, n-butyraldimine and ammonia, said mixture containing, exclusive of the ammonia, from about 20 to about 25 per cent by weight of n-butyraldehyde and containing more ammonia than is molecularly equivalent to the n-butyraldehyde which is present.

7. A process for preparing n-butylamine comprising hydrogenating, in a closed vessel and in the presence of a nickel hydrogenation catalyst, a mixture consisting essentially of n-butyraldehyde, n-butyraldimine and ammonia, said mixture, exclusive of the ammonia, containing from about 20 to about 50 per cent by weight of n-butyraldehyde and containing about 1.5 moles of ammonia for each mole of n-butyraldehyde which is present.

8. A process for preparing n-butylamine comprising hydrogenating, at from 135° to 165° C., in a closed vessel and in the presence of a nickel hydrogenation catalyst, a mixture consisting essentially of n-butyraldehyde, n-butyraldimine and ammonia, said mixture containing, exclusive of the ammonia, from about 20 to about 50 per cent by weight of n-butyraldehyde and containing more ammonia than is molecularly equivalent to the n-butyraldehyde which is present.

9. A process for preparing n-butylamine comprising hydrogenating, at from 135° to 165° C., in a closed vessel and in the presence of a nickel hydrogenation catalyst, a mixture consisting essentially of n-butyraldehyde, n-butyraldimine and ammonia, said mixture containing, exclusive of the ammonia, from about 20 to about 25 per cent by weight of n-butyraldehyde and containing more ammonia than is molecularly equivalent to the n-butyraldehyde which is present.

10. A process for preparing n-butylamine comprising hydrogenating, at from 135° to 165° C., in a closed vessel and in the presence of a nickel hydrogenation catalyst, a mixture consisting essentially of n-butyraldehyde, n-butyraldimine and ammonia, said mixture containing, exclusive of the ammonia, from about 20 to about 25 per cent by weight of n-butyraldehyde and containing from about 1.1 to about 2 moles of ammonia for each mole of n-butyraldehyde which is present.

MARSHALL R. BRIMER.
JAMES E. MAGOFFIN.
HAROLD VON BRAMER.

REFERENCES CITED

The following references are of record in the file of this patent:

UNITED STATES PATENTS

| Number | Name | Date |
|---|---|---|
| 1,762,742 | Reppe | June 10, 1930 |
| 2,278,372 | Olin | Mar. 31, 1942 |
| 2,278,373 | Olin | Mar. 31, 1942 |
| 2,420,584 | Brimer et al. | May 13, 1947 |

FOREIGN PATENTS

| Number | Country | Date |
|---|---|---|
| 365,214 | Great Britain | Jan. 21, 1932 |